(12) United States Patent
Ruayana et al.

(10) Patent No.: US 11,728,636 B2
(45) Date of Patent: Aug. 15, 2023

(54) FLAT FLEXIBLE ELECTRICAL CONDUCTOR AND SUPPORTING DEVICE THEREFOR

(71) Applicant: Lear Corporation, Southfield, MI (US)

(72) Inventors: Jun Ruayana, Lapu-Lapu (PH); Erwin BagaAn, Lapu-Lapu (PH)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/567,075

(22) Filed: Dec. 31, 2021

(65) Prior Publication Data

US 2023/0216286 A1 Jul. 6, 2023

(51) Int. Cl.
| | |
|---|---|
| *H02G 3/20* | (2006.01) |
| *H02G 3/30* | (2006.01) |
| *B60R 16/02* | (2006.01) |
| *F16L 3/00* | (2006.01) |

(52) U.S. Cl.
CPC .......... *H02G 3/24* (2013.01); *B60R 16/0215* (2013.01); *F16L 3/00* (2013.01)

(58) Field of Classification Search
CPC .......... H02G 3/24; B60R 16/0215; F16L 3/00
USPC .......................................................... 248/65
See application file for complete search history.

(56) References Cited

U.S. PATENT DOCUMENTS

| | | | | |
|---|---|---|---|---|
| 3,896,259 | A * | 7/1975 | Fry | F16L 3/22 156/308.2 |
| 4,253,226 | A * | 3/1981 | Takeda | A44B 17/0035 264/249 |
| 4,833,775 | A * | 5/1989 | Nager, Jr. | H05K 3/326 29/853 |
| 4,861,208 | A * | 8/1989 | Boundy | F16B 19/1081 411/908 |
| 4,918,261 | A * | 4/1990 | Takahashi | F16L 3/23 174/72 A |
| 6,483,035 | B2 * | 11/2002 | Hasegawa | H01R 12/61 174/92 |
| 7,481,474 | B2 * | 1/2009 | Higgins | F16B 21/086 24/297 |
| 2006/0112519 | A1 | 6/2006 | Harmon et al. | |
| 2021/0045197 | A1 | 2/2021 | Werner et al. | |

* cited by examiner

*Primary Examiner* — Muhammad Ijaz
(74) *Attorney, Agent, or Firm* — MacMillan, Sobanski & Todd, LLC

(57) ABSTRACT

An assembly of a flat flexible electrical conductor and a supporting device that quickly and easily supports an intermediate portion of a flat flexible electrical conductor on a support surface. The flat flexible electrical conductor includes a plurality of electrically conductive traces supported on an electrically non-conductive insulator. The electrically non-conductive insulator has an opening extending therethrough. The supporting device includes a head portion and a shaft portion. The head portion includes first and second flanges disposed on opposite sides of the flat flexible electrical conductor and an intermediate portion that extends through the opening of the electrically non-conductive insulator.

6 Claims, 5 Drawing Sheets

FLAT FLEXIBLE ELECTRICAL CONDUCTOR AND SUPPORTING DEVICE THEREFOR

BACKGROUND OF THE INVENTION

This invention relates in general to mechanisms for supporting electrical conductors that extend between electrical devices in electrical systems. In particular, this invention relates to an assembly of a flat flexible electrical conductor and a supporting device that quickly and easily supports an intermediate portion of the flat flexible electrical conductor on a support surface.

Many electrical systems are known in the art that include one or more electrically operated devices. For example, most automobiles and other vehicles include a variety of electrically operated devices that can be selectively operated for the comfort and convenience of a driver or an occupant. Typically, each of the electrically operated devices is connected to a source of electrical energy (and/or other components of the electrical system) by one or more electrical conductors. In many instances, electrical connector assemblies are provided on opposed ends of the electrical conductors for facilitating the installation, service, and removal of the electrically operated devices to and from the electrical system.

Frequently, these electrical conductors are embodied as flat flexible electrical conductors. A typical flat flexible electrical conductor includes a plurality of electrically conductive traces that are surrounded by or otherwise supported on an electrically non-conductive insulator. Such flat flexible electrical conductors permit a plurality of such electrical connections to be made conveniently, efficiently, and inexpensively. In order to prevent premature wear or inadvertent damage from occurring, it is often desirable to support an intermediate portion of an electrical conductor (i.e., the portion of the electrical conductor that extends between the opposed ends thereof) on a fixed support surface as the electrical conductor extends through a working environment. This is particularly important when the electrical conductor is embodied as a flat flexible electrical conductor that extends through the relatively harsh working environment provided in most automobiles and other vehicles.

Although a variety of supporting devices are known for this purpose, it would be desirable to provide an improved assembly of a flat flexible electrical conductor and a supporting device that quickly and easily supports an intermediate portion of such a flat flexible electrical conductor on a support surface.

SUMMARY OF THE INVENTION

This invention relates to an assembly of a flat flexible electrical conductor and a supporting device that quickly and easily supports an intermediate portion of a flat flexible electrical conductor on a support surface. The flat flexible electrical conductor includes a plurality of electrically conductive traces supported on an electrically non-conductive insulator. The electrically non-conductive insulator has an opening extending therethrough. The supporting device includes a head portion and a shaft portion. The head portion includes first and second flanges disposed on opposite sides of the flat flexible electrical conductor and an intermediate portion that extends through the opening of the electrically non-conductive insulator.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
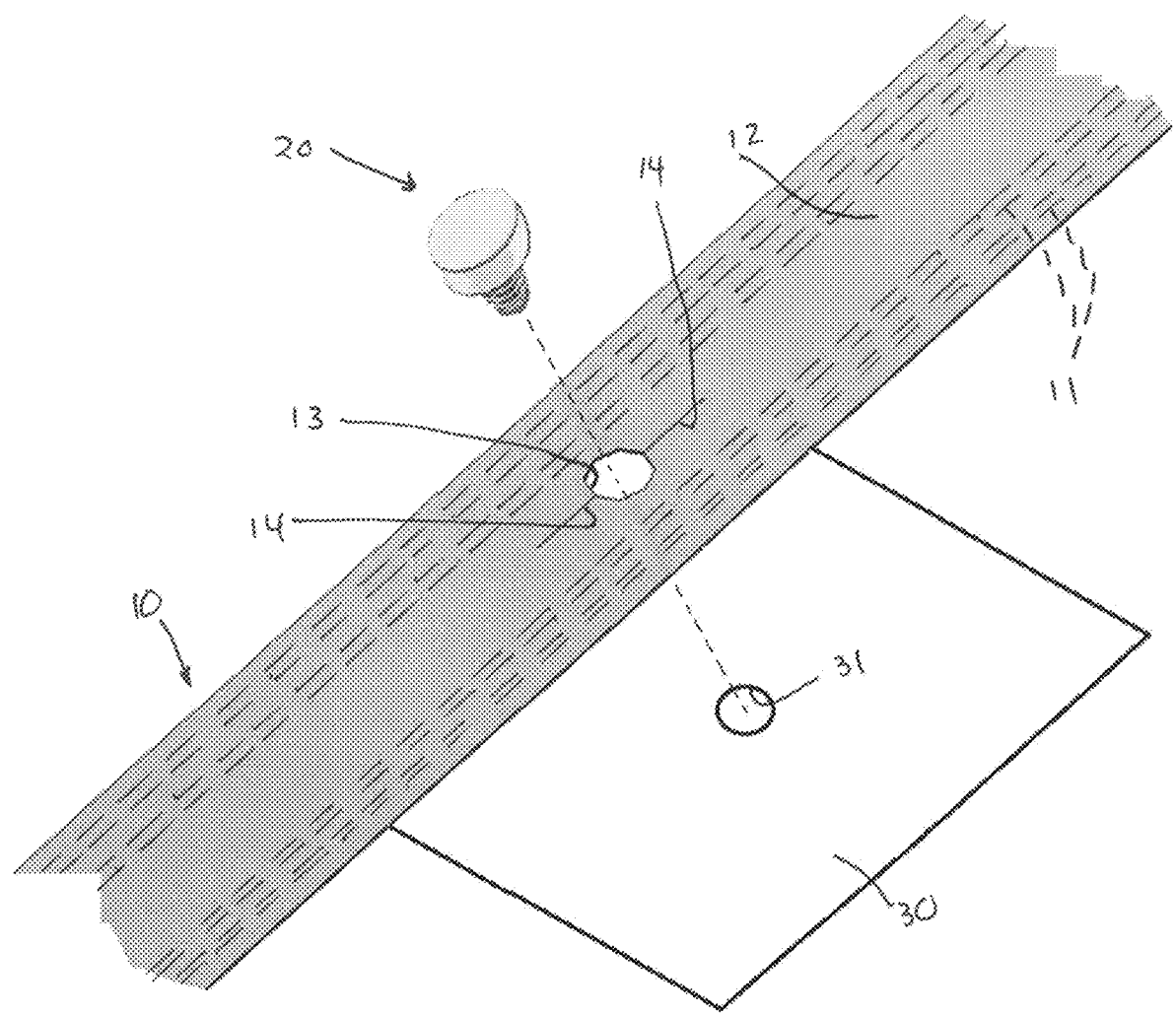
FIG. 1 is an exploded perspective view of a first embodiment of an assembly of a flat flexible electrical conductor and a supporting device in accordance with this invention.

Referring now to the drawings, there is illustrated in FIG. 1 an assembly of a flat flexible electrical conductor, indicated generally at 10 and a supporting device, indicated generally at 20, in accordance with a first embodiment of this invention. As will be explained in greater detail below, the structures of the flat flexible electrical conductor 10 and the supporting device 20 are specifically designed to support one or more intermediate portions of the flat flexible electrical conductor 10 on or otherwise relative to a fixed support surface, indicated generally at 30. The fixed support surface 30 may, for example, be a portion of a frame or other support structure contained within a vehicle. However, the fixed support surface 30 may be disposed or otherwise provided within any desired working environment. The fixed support surface 30 includes an attachment mechanism 31 for facilitating the securement of the assembly of the flat flexible electrical conductor 10 and the supporting device 20 thereto. In the illustrated embodiment, this attachment mechanism 31 is an aperture that extends completely through the fixed support surface 30. However, the attachment mechanism 31 may be embodied as any desired structure.

The illustrated flat flexible electrical conductor 10 includes a plurality of electrically conductive traces 11 that are surrounded by an electrically non-conductive insulator 12. However, the flat flexible electrical conductor 10 may include any desired number of such electrically conductive traces 11, and such electrically conductive traces 11 may be supported on the electrically non-conductive insulator 12 in any desired manner. The flat flexible electrical conductor 10 includes a first end (not shown) having a first electrical connector provided thereon and a second end (not shown) having a second electrical connector provided thereon. In a manner that is well known in the art, the electrically conductive traces 11 contained within the flat flexible electrical conductor 10 are connected to respective electrical contacts (not shown) provided within the first and second electrical connectors that facilitate electrical connections between each of such traces 11 and one or more electrically operated devices (not shown) provided in an electrical system. Thus, the illustrated portion of the flat flexible electrical conductor 10 is an intermediate portion that is located between the first and second ends thereof.

An opening 13 extends through the flat flexible electrical conductor 10. In the illustrated embodiment, the opening 13 is generally hexagonal in shape. However, the opening 13 may have any desired shape. Additionally, first and second slits 14 extend through the flat flexible electrical conductor 10. In the illustrated embodiment, the slits 14 extend in opposite axial directions from opposed edges of the opening 13 through the 10. However, any desired number of such slits 14 may extend from any desired portions of (and in any desired directions from) the opening 13. The purposes for the opening 13 and the slits 14 will be explained below.

Figure 2:
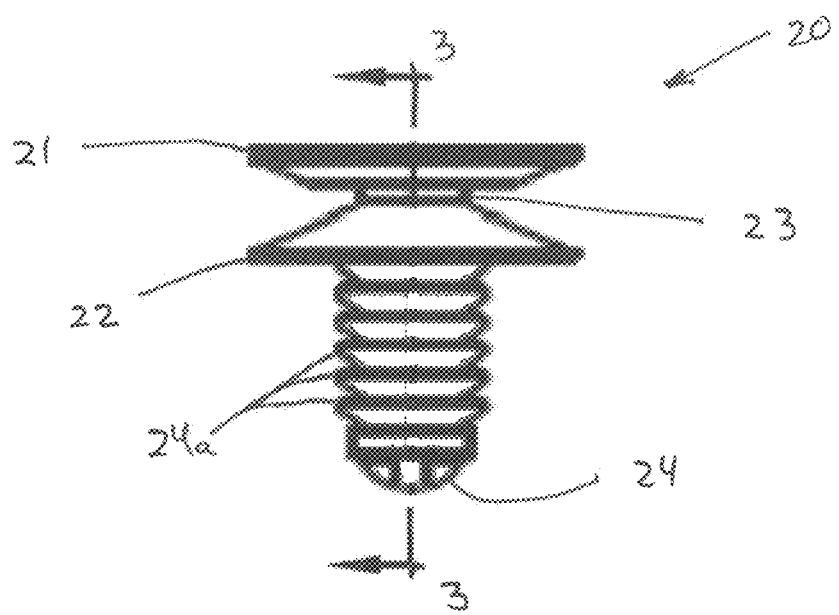
FIG. 2 is an enlarged side elevational view of the supporting device illustrated in FIG. 1.
Figure 3:
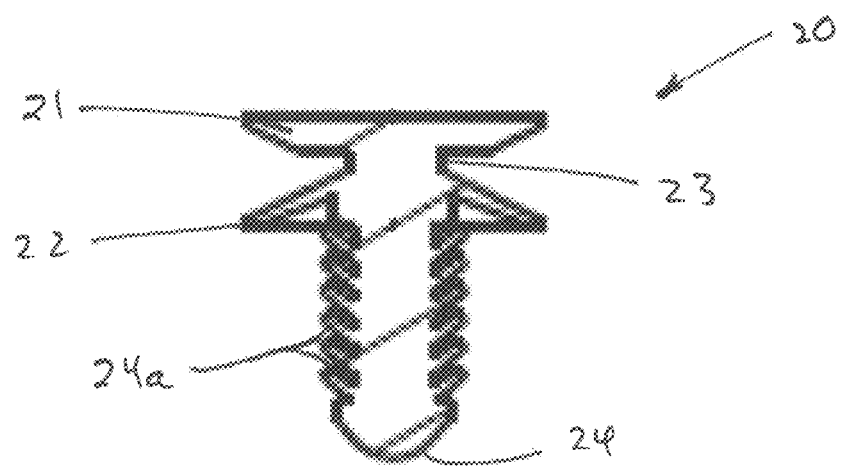
FIG. 3 is a sectional elevational view taken along line 3-3 of FIG. 2.

The structure of the supporting device 20 is illustrated in detail in FIGS. 2 and 3. As shown therein, the supporting device 20 includes a head portion having a first flange 21 and a second flange 22 that are axially spaced apart from one another by an intermediate portion 23. In the illustrated embodiment, each of the first flange 21 and the second flange 22 has a cross-sectional shape in the general form of a truncated cone, and the angled surfaces of such truncated cones faced inwardly toward the intermediate portion 23. However, the first flange 21 and the second flange 22 may have any desired cross-sectional shape or combination of shapes. As best shown in FIG. 3, the first flange 21 and the second flange 22 each define a first outer dimension D1 that is larger than a second outer dimension D2 defined by the intermediate portion 23. In the illustrated embodiment, the first outer dimensions D1 defined by the first flange 21 and the second flange 22 are identical, although such is not required.

For a purpose that will be described below, the outer surface of the intermediate portion 23 of the supporting device 20 may be formed having a shape that generally conforms with the shape of the opening 13 that extends through the flat flexible electrical conductor 10. Thus, in the illustrated embodiment, the outer surface of the intermediate portion 23 of the supporting device 20 may be hexagonal in shape. However, the opening 13 may have any desired shape.

The supporting device 20 also includes a shaft portion 24 that extends from the head portion. In the illustrated embodiment, the shaft portion 24 is generally cylindrical in shape, although such is not required. In the illustrated embodiment, the shaft portion 24 has a plurality of annular serrations 24a provided thereon. The purpose for the first and second flanges 21 and 2, the intermediate portion 23, and the shaft portion 24 and serrations 24a will be explained below.

Figure 4:
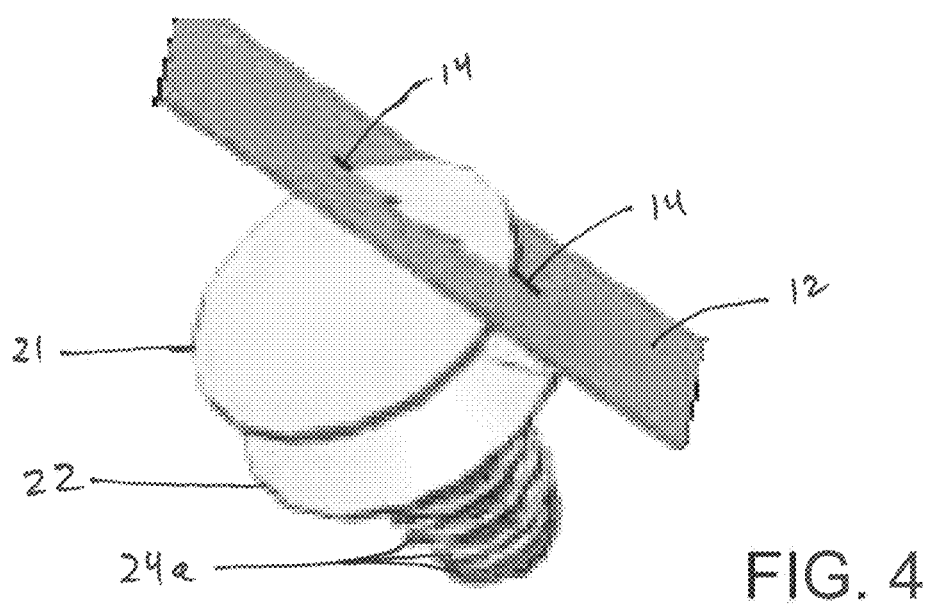
FIG. 4 is an enlarged perspective view of portions of the flat flexible electrical conductor and the supporting device illustrated in FIGS. 1, 2, and 3 shown in a first stage of assembly.
Figure 5:
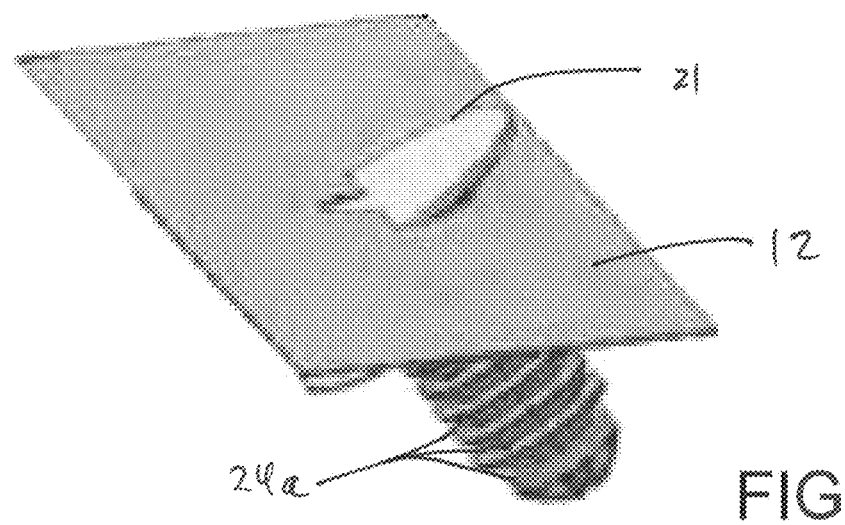
FIG. 5 is a perspective view of the portions of the flat flexible electrical conductor and the supporting device illustrated in FIG. 4 shown in a second stage of assembly.
Figure 6:
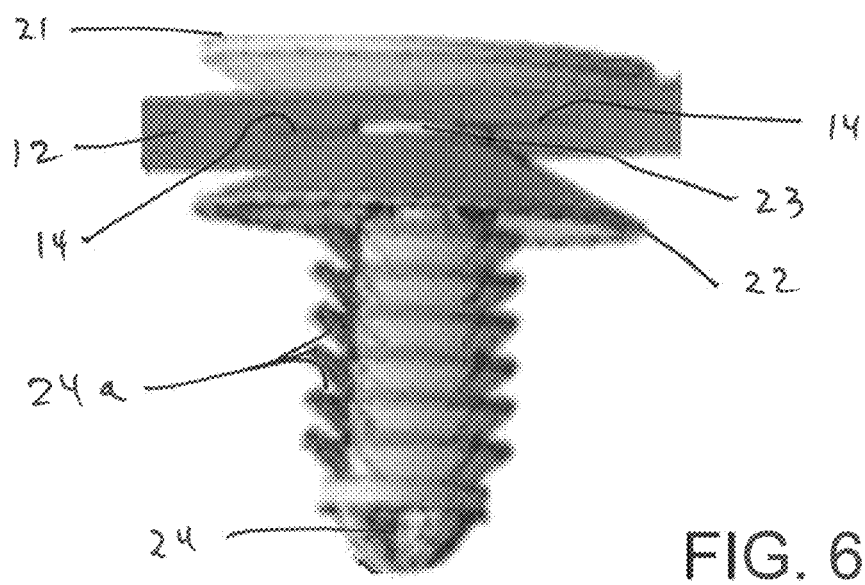
FIG. 6 is a perspective view of the portions of the flat flexible electrical conductor and the supporting device illustrated in FIG. 5 shown in a third stage of assembly.

FIGS. 4, 5, and 6 illustrate how the flat flexible electrical conductor 10 may be assembled with the supporting device 20. Initially, as shown in FIG. 4, a portion of the first flange 21 of the supporting device 20 is initially inserted through the opening 13 of the flat flexible electrical conductor 10. This can be accomplished by aligning the first flange 21 with the opening 13 and the slits 14 and then exerting a force to urge the first land 21 to move therethrough, as shown in FIG. 5. Such urging is continued until the entire first flange 21 has been moved through the opening 13 and the slits 14. Thereafter, the supporting device 20 can be pivoted back so that it extends generally perpendicular to the flat flexible electrical connector 10, as shown in FIG. 6.

In this orientation, the flat flexible electrical connector 10 is captured between the first and second flanges 21 and 22 and, therefore, is positively retained on the supporting device 20. Consequently, it is highly unlikely that the flat flexible electrical connector 10 could be inadvertently removed from the supporting device 20. As mentioned above, the outer surface of the intermediate portion 23 of the supporting device 20 may be formed having a shape that generally conforms with the shape of the opening 13 that extends through the flat flexible electrical conductor 10. As a result, relative rotational movement between the flat flexible electrical connector 10 and the supporting device 20 can be prevented.

After the flat flexible electrical connector 10 and the supporting device 20 and been assembled together, the shaft portion 24 of the supporting device 20 is aligned with the opening 31 through the fixed support surface 30 (as shown in FIG. 1) and moved therethrough. The serrations 24a provided on the shaft portion 24 engage the fixed support surface 30 so as to prevent the supporting device 20 from being removed from the fixed support surface 30. Therefore, the supporting device 20 is positively retained on the fixed support surface 30. Thus, the supporting device 20 quickly and easily supports the intermediate portion of the flat flexible electrical conductor 10 on the support surface 30.

Figure 7:
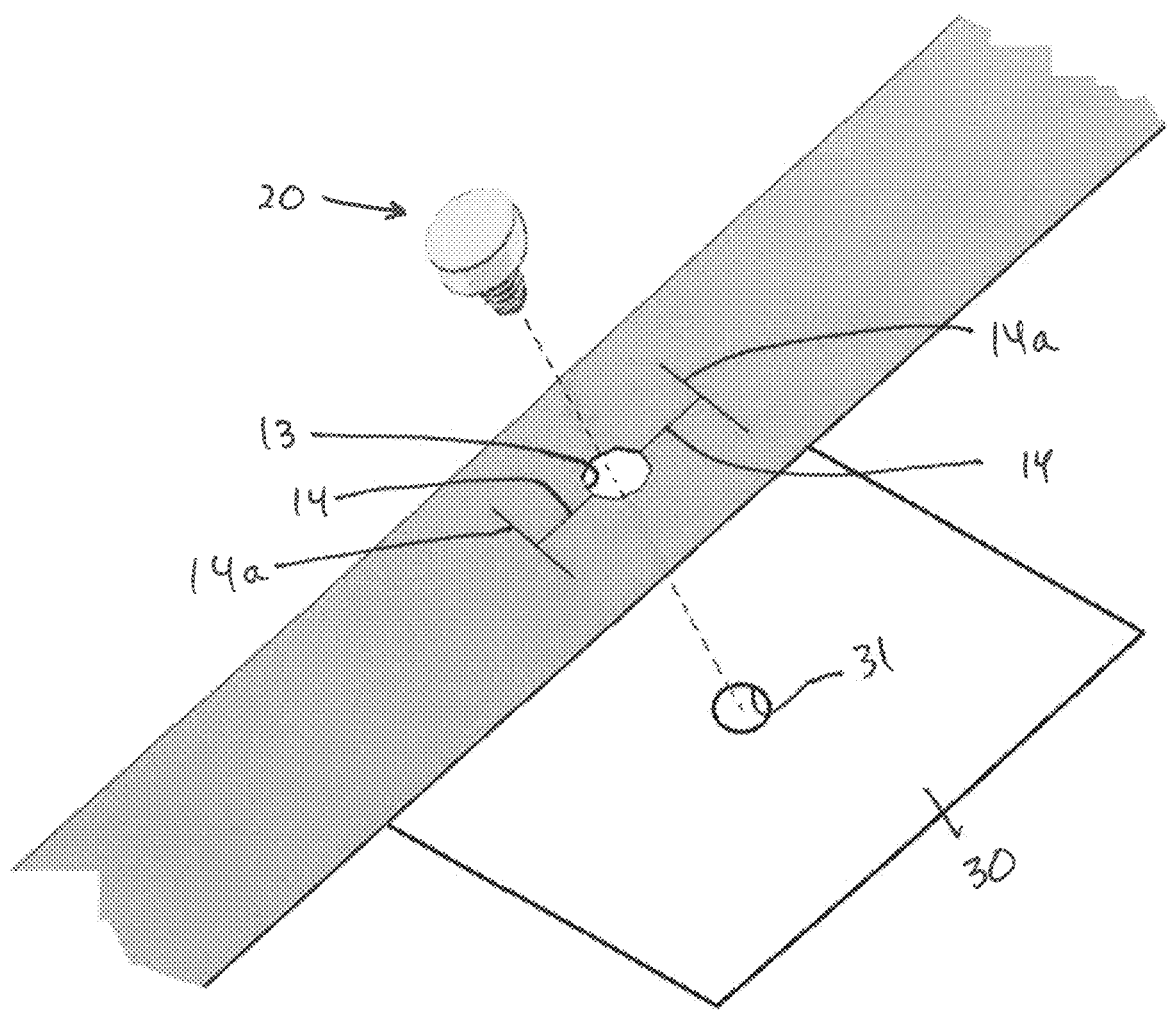
FIG. 7 is an exploded perspective view of a second embodiment of an assembly of a flat flexible electrical conductor and a supporting device in accordance with this invention.

FIG. 7 illustrates a second embodiment of an assembly of a flat flexible electrical conductor and a supporting device in accordance with this invention. The second embodiment of the assembly is, in large measure, identical to the first embodiment, and like reference numbers are used to indicate corresponding structures. In this second embodiment, however, the slits 14 extending through the flat flexible electrical conductor 10 include respective end portions 14a. In the illustrated embodiment, these end portions 14a extend transversely from the outermost ends of the slits 14. However, the end portions 14a may extend in any desired direction from any desired portion or portions of the slits 14.

Figure 8:
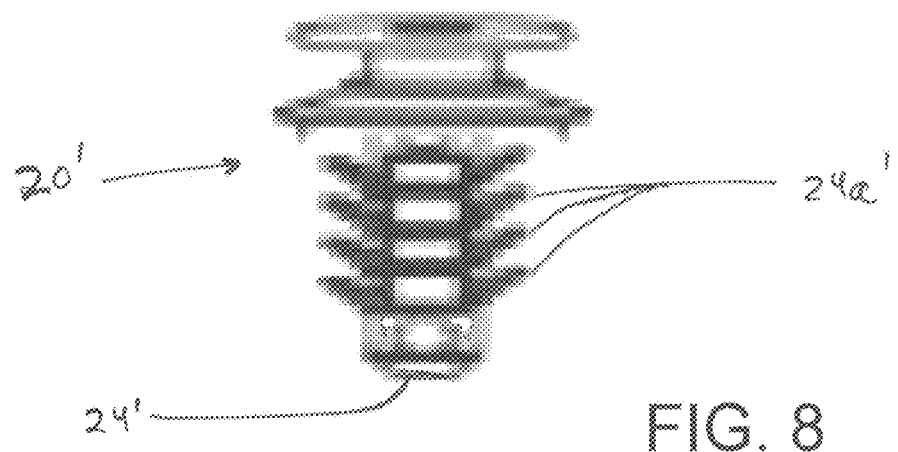
FIG. 8 is an enlarged side elevational view of a first alternative embodiment of the supporting device illustrated in FIGS. 1 through 5.
Figure 9:
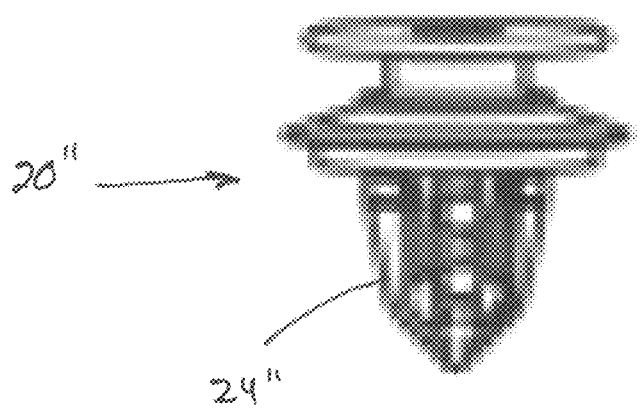
FIG. 9 is an enlarged side elevational view of a second alternative embodiment of the supporting device illustrated in FIGS. 1 through 5.
Figure 10:
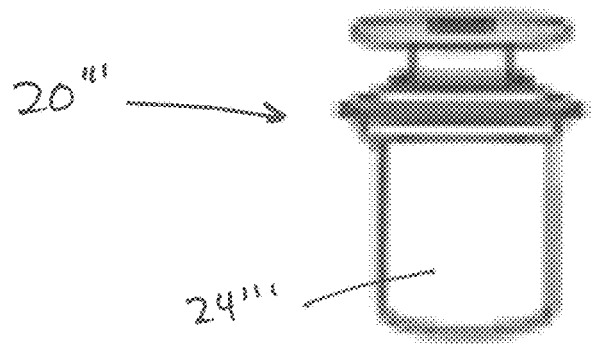
FIG. 10 is an enlarged side elevational view of a third alternative embodiment of the supporting device illustrated in FIGS. 1 through 5.

FIGS. 8, 9, and 10 illustrate alternative embodiments of the shaft portion 24 of the supporting device 20. As shown in FIG. 8, the serrations 24a' provided on the shaft portion 24 of the supporting device 20 may have relatively thin cross-sectional shapes that provide greater flexibility than the relatively thick cross-sectional shapes of the serrations 24 illustrated in FIGS. 1 through 7. As shown in FIG. 9, the serrations 24" provided on the shaft portion 24 of the supporting device 20 may have curved cross-sectional shapes that are similar to a rosebud. Lastly, as shown in FIG. 10, the shaft portion 24''' of the supporting device 20 may be generally cylindrical in shape.

The principle and mode of operation of this invention have been explained and illustrated in its preferred embodiments. However, it must be understood that this invention may be practiced otherwise than as specifically explained and illustrated without departing from its spirit or scope.

What is claimed is:
1. An assembly comprising:
   a flat flexible electrical conductor including a plurality of electrically conductive traces supported on an electri- cally non-conductive insulator, the electrically non-conductive insulator having an opening extending therethrough; and a supporting device including a head portion and a shaft portion, the head portion including first and second flanges disposed on opposite sides of the flat flexible electrical conductor and an intermediate portion that extends through the opening of the electrically non-conductive insulator.

2. The assembly defined in claim 1 wherein an inner surface of the opening of the electrically non-conductive insulator and an outer surface of the intermediate portion of the supporting device engage one another to prevent relative rotation between the flat flexible electrical conductor and the supporting device.

3. The assembly defined in claim 1 wherein each of the first and second flanges has a cross-sectional shape in a general form of a truncated cone.

4. The assembly defined in claim 3 wherein angled surfaces of the truncated cones face inwardly toward the intermediate portion.

5. The assembly defined in claim 1 further including first and second slits that extend through the flat flexible electrical conductor.

6. The assembly defined in claim 5 wherein the first and second slits extend in opposite axial directions from opposed edges of the opening through the flat flexible electrical conductor.

\* \* \* \* \*